(12) United States Patent
Clebowicz et al.

(10) Patent No.: US 8,320,829 B1
(45) Date of Patent: Nov. 27, 2012

(54) ENABLING ON-DEMAND INTER-SPACECRAFT RESOURCE SHARING AND COORDINATION

(75) Inventors: Brian A. Clebowicz, Manhattan Beach, CA (US); Jeff Nocket, Harbor City, CA (US)

(73) Assignee: The Boeing Company, Chicago, IL (US)

(*) Notice: Subject to any disclaimer, the term of this patent is extended or adjusted under 35 U.S.C. 154(b) by 708 days.

(21) Appl. No.: 12/489,217

(22) Filed: Jun. 22, 2009

(51) Int. Cl.
- *H04B 7/19* (2006.01)
- *H04W 4/00* (2009.01)
- *H04W 40/00* (2009.01)

(52) U.S. Cl. ...... 455/12.1; 455/13.1; 455/427; 455/429; 455/428

(58) Field of Classification Search .......... 455/429, 455/431, 12.1, 13.1; 566/12.1, 13.1, 429, 566/431
See application file for complete search history.

(56) References Cited

U.S. PATENT DOCUMENTS

| | | | | |
|---|---|---|---|---|
| 5,966,442 | A | * | 10/1999 | Sachdev .................. 380/212 |
| 6,002,916 | A | * | 12/1999 | Lynch ..................... 455/13.1 |
| 6,349,195 | B1 | | 2/2002 | Saunders |
| 2004/0185775 | A1 | | 9/2004 | Bell et al. |
| 2006/0040612 | A1 | * | 2/2006 | Min ........................ 455/12.1 |

OTHER PUBLICATIONS

LoBosco, David M., et al. "The Pleiades fractionated space system architecture and the future of national security space," AIAA Space 2008 Conference & Exposition, Sep. 9-11, 2008, San Diego, California.

Brown, Owen, et al. "Application of Value-Centric Design to Space Architectures: The Case of Fractionated Spacecraft," AIAA Space 2008 Conference & Exposition, Sep. 9-11, 2008, San Diego, California.

* cited by examiner

*Primary Examiner* — Tilahun B Gesesse
(74) *Attorney, Agent, or Firm* — Vista IP Law Group LLP; Cynthia A. Dixon

(57) ABSTRACT

A system and method for enabling on-demand inter-spacecraft resource sharing and coordination are disclosed involving at least one wireless device and a payload. At least one wireless device transmits and receives communications to at least one access point and at least one user. In one or more embodiments, spacecrafts are employed for the access points and/or the users. The payload comprises at least one transponder and at least one processor. At least one transponder transmits and receives the communications to at least one access point and at least one user. The processor provides channelized communication and regenerative communication to at least one user. Also, the processor monitors signal quality of the communications received from at least one user. In one or more embodiments, the wireless device is a radio frequency (RF) omni-directional antenna. In some embodiments, the wireless device is a diffuse optical emitter and receiver.

16 Claims, 6 Drawing Sheets

FIG. 2 *(Prior Art)*
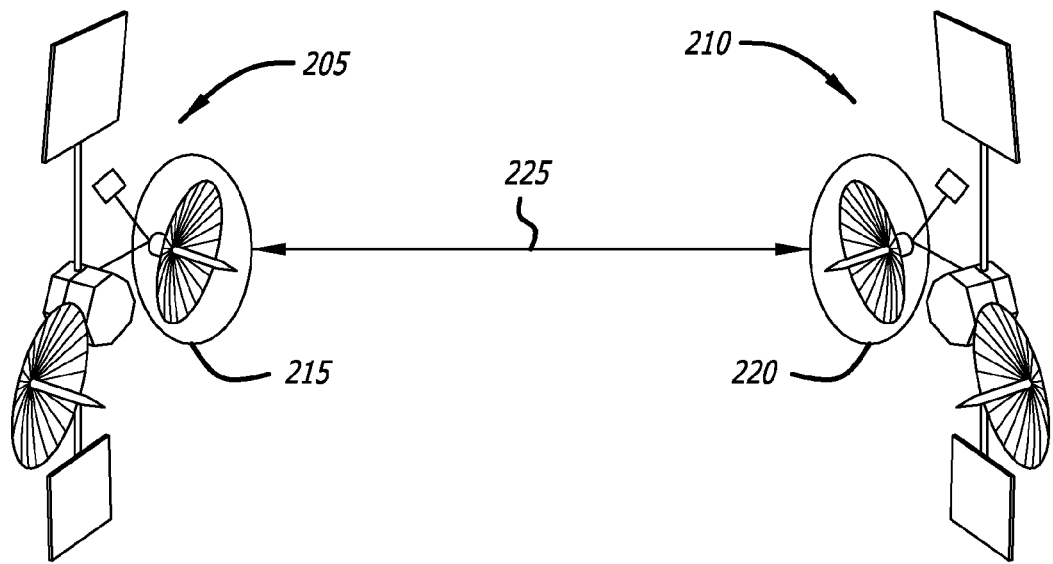
FIG. 3
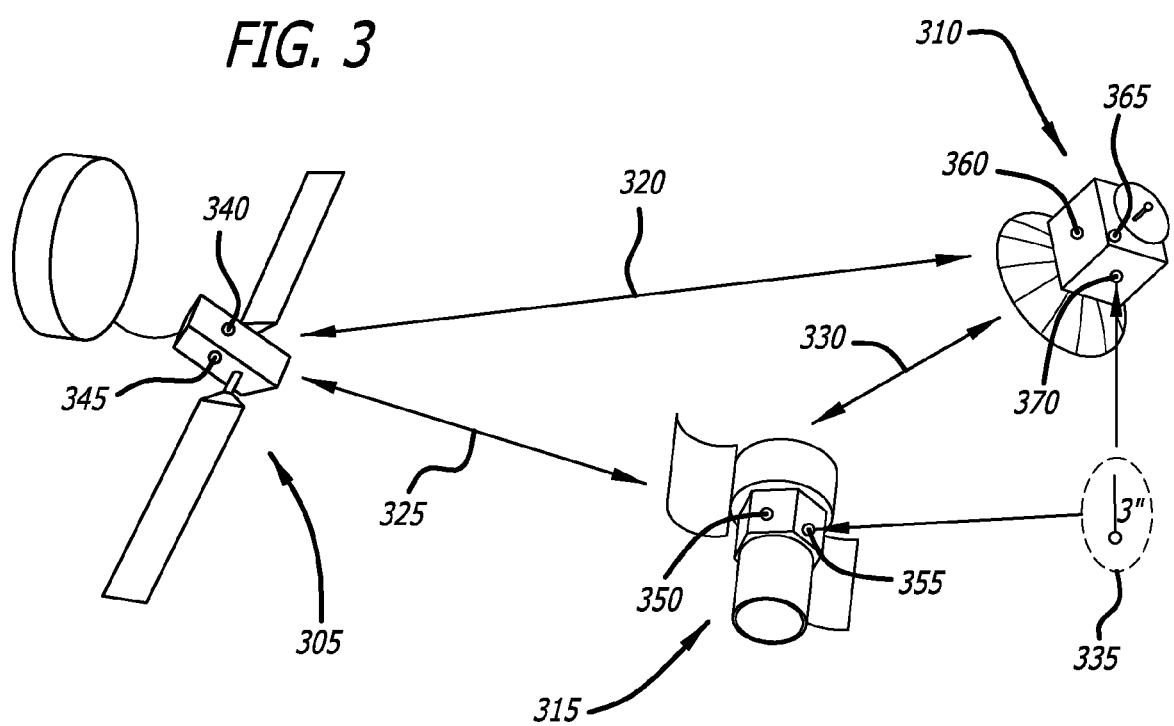

ENABLING ON-DEMAND INTER-SPACECRAFT RESOURCE SHARING AND COORDINATION

BACKGROUND

The present disclosure relates to inter-spacecraft resource sharing and coordination. In particular, it relates to enabling on-demand inter-spacecraft resource sharing and coordination.

SUMMARY

The present disclosure relates to an apparatus, system, and method for enabling on-demand inter-spacecraft resource sharing and coordination. In one or more embodiments, the system for enabling on-demand inter-spacecraft resource sharing and coordination involves at least one wireless device and a payload. In one or more embodiments, at least one wireless device transmits and receives communications to at least one access point and at least one user.

In some embodiments, the payload comprises at least one transponder and at least one processor. In the system, at least one transponder transmits and receives the communications to at least one access point and at least one user. In addition, at least one processor provides channelized communication and/or regenerative communication to at least one user. Also, at least one processor monitors the signal quality of the communications received from at least one user.

In one or more embodiments, at least one access point is a spacecraft. In some embodiments, at least one user is a spacecraft.

In some embodiments, at least one wireless device is a radio frequency (RF) antenna. In some embodiments, a short, fixed omni-directional stud antenna is employed for the radio frequency (RF) antenna. In various embodiments, the radio frequency (RF) antenna transmits and receives V-band and/or W-band. In one or more embodiments, at least one wireless device is a diffuse optical emitter and receiver. The diffuse optical emitter and receiver is used to transmit and receive optical communications.

In one or more embodiments of the system, at least one processor of the payload operates in a broadcast mode during initial transmission communication with at least one user. In some embodiments, at least one processor monitors the signal quality of the communications for any piggybacked waveforms from any unwanted signals. In addition, at least one processor monitors the signal quality of the communications for any jammed signals.

In some embodiments, the method for enabling on-demand inter-spacecraft resource sharing and coordination involves transmitting and receiving, with at least one wireless device, communications to at least one access point and at least one user. The method further comprises transmitting and receiving, with at least one transponder, the communications to at least one access point and at least one user.

In addition, the method also includes providing, with at least one processor, channelized communication and/or regenerative communication for at least one user. In some embodiments, at least one processor monitors the signal quality of the communications received from at least one user.

In some embodiments, at least one access point is a spacecraft, and at least one user is a spacecraft.

In one or more embodiments, a diffuse optical emitter and receiver is utilized for at least one wireless device. The diffuse optical emitter and receiver transmits and receives optical communications. In one or more embodiments, at least one wireless device is a radio frequency (RF) antenna. In some embodiments, the radio frequency (RF) antenna is a short, fixed omni-directional stub antenna. In one or more embodiments, the radio frequency (RF) antenna transmits and receives V-band and/or W-band.

In some embodiments, at least one processor is used for monitoring the signal quality of the communications for any piggybacked waveforms from any unwanted signals. In some embodiments, at least one processor is used for monitoring the signal quality of the communications for any jammed signals.

In one or more embodiments, the system for enabling on-demand inter-spacecraft resource sharing and coordination involves at least one wireless device means and a payload. In this system, at least one wireless device means is used for transmitting and receiving communications to at least one access point and at least one user.

In some embodiments, the payload comprises at least one transponder means and at least one processor means. At least one transponder means is utilized for transmitting and receiving communications to at least one access point and at least one user. In some embodiments, at least one processor means is used for providing channelized communication and/or regenerative communication for at least one user. In addition, at least one processor means is employed for monitoring signal quality of the communications received from at least one user.

DRAWINGS

These and other features, aspects, and advantages of the present disclosure will become better understood with regard to the following description, appended claims, and accompanying drawings where:

FIG. 2 is a depiction of a prior art conventional spacecraft crosslink approach.

FIG. 3 is an illustration of an outrigger routing approach, which enables ad-hoc, on-demand connectivity between various access points and users, in accordance with at least one embodiment of the present disclosure.

DESCRIPTION

Figure 1:
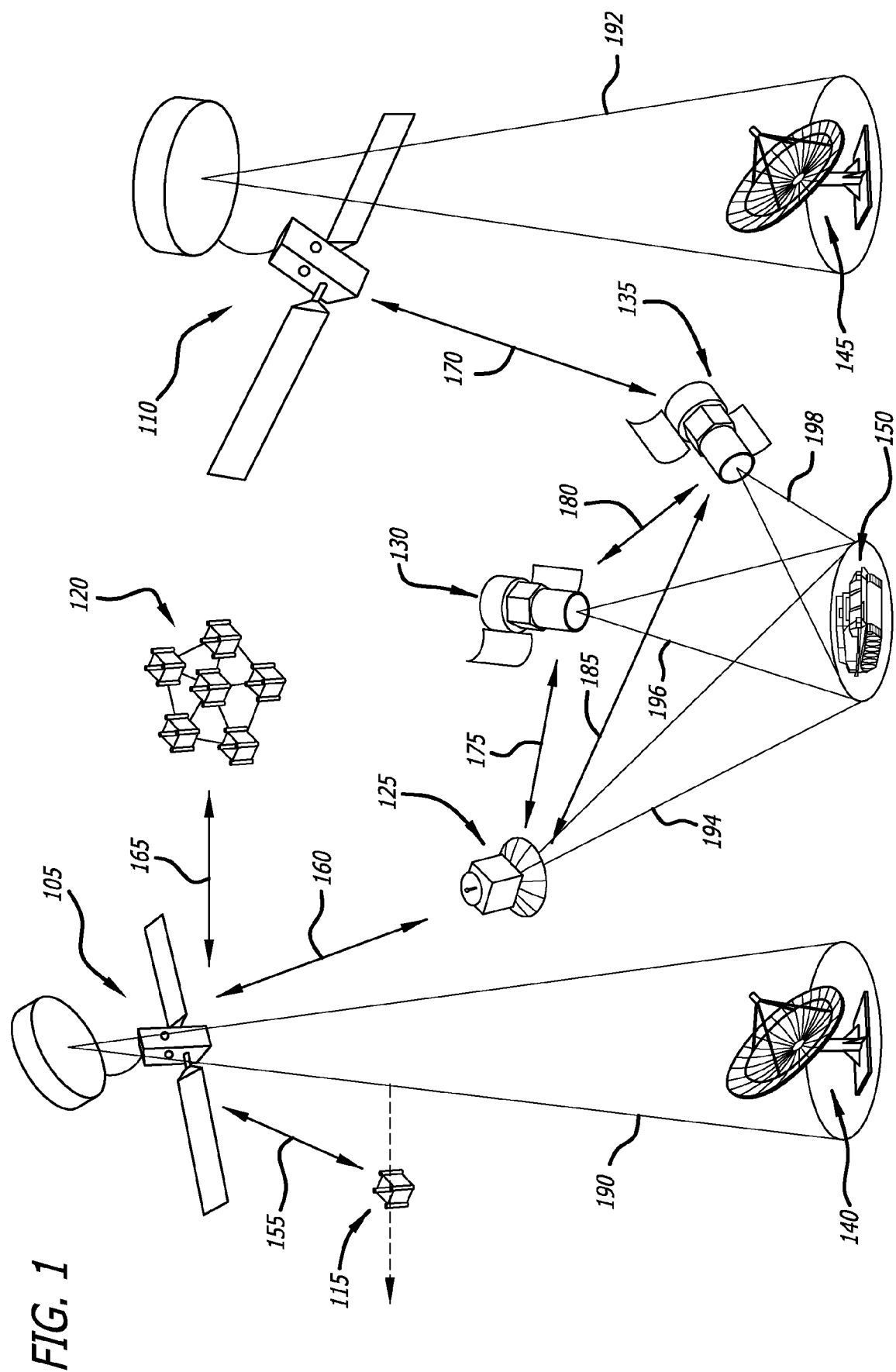
FIG. 1 is an illustration of outriggers enabling access points and users to share and coordinate their resources on-demand, in accordance with at least one embodiment of the present disclosure.

The methods and apparatus disclosed herein provide an operative system for inter-spacecraft resource sharing and coordination. Specifically, this system allows for enabling on-demand inter-spacecraft resource sharing and coordination. The system of the present disclosure transforms conventional satellites into proximity, on-demand broadband wireless access points that can be employed by user spacecraft to communicate with earth stations and/or remote satellites, or to share resources. In particular, the system provides secure, proximity, wireless communication access points in space that enable spacecraft of heterogeneous or homogeneous design from the same or different operators to share each others key resources, to grow capability incrementally, to work cooperatively to achieve mission or multi-mission objectives, and to perform mutual sparing of resources.

In one or more embodiments, the system enables commercial and government spacecraft to wirelessly share on-demand and integrate major resources with each other and with smaller, simpler, less visible client spacecraft, whose primary mission may be remote sensing, scientific observing, monitoring, or relaying communications. This sharing of resources feature of the disclosed system allows for a reduction in individual spacecraft cost and risk, while enabling the resources of large service spacecraft to be employed more flexibly, broadly, and profitably without intimate knowledge of the client spacecraft's mission. Types of spacecraft that may be employed with this system include, but are not limited to, commercial satellites, government satellites, remote sensing satellites, earth observation satellites, space observation satellites, monitoring satellites, communications relay satellites, inspection satellites, cleanup satellites, and cluster satellites. In addition, for this system, the spacecraft may be placed in orbits including, but not limited to, a lower earth orbit (LEO), a medium earth orbit (MEO), a geostationary earth orbit (GEO) and/or an inclined orbit at various degrees.

In some embodiments, the disclosed system comprises at least one compact, demand accessible radio frequency (RF) and/or optical payload that is integrated into service providing spacecraft. The system further comprises at least one compact, demand accessible radio frequency (RF) and/or optical payload that is integrated into spacecraft that use services from the service providing spacecraft. Each payload has attached to it at least one radio frequency (RF) antenna and/or at least one diffuse optical emitter and receiver attached. These integrated payloads of the spacecraft allow for the resources of the access points to be available to the users, and vice-versa.

For this system, the demand accessible payloads along with their associated radio frequency (RF) antennas and/or diffuse optical emitters and receivers are referred to as "outriggers". Also, for this system, the service providing spacecraft are referred to as "access points", and the spacecraft that use services from the service providing spacecraft are referred to as "users".

In one or more embodiments, the designation of a spacecraft to be a "user" and the designation of a spacecraft to be an "access point" is dependent upon which spacecraft sends an initial request for an available link. If a spacecraft sends a request for a link to another spacecraft, for this system, the spacecraft that sends the request for the link is be considered to be the "user", and the spacecraft that receives the request for the link is be considered to be the "access point."

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

FIG. 1 shows an illustration of outriggers enabling access points and users to share and coordinate their resources on-demand, in accordance with at least one embodiment of the present disclosure. In this illustration, outriggers, which are integrated into various types of spacecraft 105, 110, 115, 120, 125, 130, 135 are routing wireless communications and are enabling inter-spacecraft resource sharing. For example, the outrigger that is integrated into commercial and/or government satellite 105 has wireless links 155, 160, 165 with the outriggers that are integrated into orbital monitoring spacecraft 115, radar imager 125, and microsat cluster satellites 120 for routing wireless communications and/or sharing resources. The commercial and/or government satellite 105 of this figure is also shown to be performing its ordinary operations of transmitting 190 and receiving 190 wireless communications with its parabolic dish antenna to the parabolic dish antenna of ground station 140.

Also shown in this figure, the outrigger that is integrated into commercial and/or government satellite 110 has a wireless link 170 with the outrigger that is integrated into optical imager 135 for routing wireless communications and/or sharing resources. Similar to commercial and/or government satellite 105, commercial and/or government satellite 110 is illustrated as performing its ordinary operations of transmitting 192 and receiving 192 wireless communications with its parabolic dish antenna to the parabolic dish antenna of ground station 145.

Additionally depicted in this illustration, the outriggers that are integrated into radar imager 125, optical imager 130, and optical imager 135 have wireless links 175, 180, 185 with the other outriggers for routing wireless communications and/or sharing resources. Radar imager 125, optical imager 130, and optical imager 135 are also shown in this figure to be transmitting 194, 196, 198 and receiving 194, 196, 198 wireless communications with earth observation target 150, which for at least one embodiment is a military tank.

FIG. 2 shows a prior art conventional spacecraft crosslink approach. In this figure, two commercial and/or government satellites 205, 210 have a wireless crosslink 225 between their parabolic dish antennas 215, 220. In this approach, both satellites 205, 210 are commanded by ground controllers to precisely align their complex gimbaled antennas 215, 220 and to initiate communications using predetermined frequencies and modulation modes. With this approach, crosslink performance is specified within narrow bounds of data rate, range, range rate (doppler), power, and bit error rate (BER) performance.

In addition, with this conventional approach, generally each spacecraft 205, 210 is only capable of having a single predetermined crosslink with one other spacecraft 205, 210. As such, since the single crosslink is predetermined, neither spacecraft 205, 210 employs a broadcast mode of operation for the initial crosslink communications. However, it should be noted that there are some spacecraft that employ this conventional crosslink approach and are capable of having more than one crosslink with more than one other spacecraft. But, in order for these additional crosslinks to be possible, these spacecraft must include additional internal hardware, software, antennas, and commands for each additional crosslink.

FIG. 3 shows an outrigger routing approach, which enables ad-hoc, on-demand connectivity between various access points and users, in accordance with at least one embodiment of the present disclosure. In this figure, the outriggers implemented in commercial and/or government satellite 305, radar imager 315, and optical imager 310 have wireless links 320, 325, 330 with the other outriggers for routing wireless communications and/or sharing resources with one another. With this approach, for all spacecraft 305, 310, 315, no antenna pointing or alignment is required for implementing the wireless links 320, 325, 330 between the outriggers.

In one or more embodiments, each outrigger that is incorporated into a spacecraft includes at least one wireless communication device 340, 345, 350, 355, 360, 365, 370. Types of wireless communication devices employed by the system include, but are not limited to, radio frequency (RF) antennas and diffuse optical emitters and receivers. In one or more embodiments, the diffuse optical emitters and receivers transmit and receive optical communications. In some embodiments, the radio frequency (RF) antennas transmit and receive signals with V-band and/or W-band frequencies. In some embodiments, short, fixed omni-directional stub antennas 335 are employed for the radio frequency (RF) antennas of the outriggers. For at least one embodiment, the short, fixed omni-directional stub antennas 335 are 3 inches in height.

Figure 4:
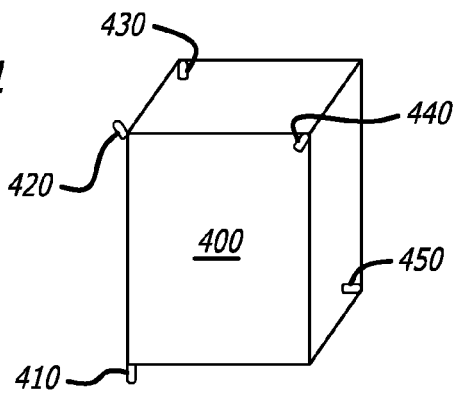
FIG. 4 is an illustration of a wireless device mounting configuration for an outrigger, in accordance with at least one embodiment of the present disclosure.

FIG. 4 an illustration of a wireless device mounting configuration for an outrigger, in accordance with at least one embodiment of the present disclosure. In this figure, a spacecraft body 400, which includes an outrigger payload (not shown), is depicted to have five wireless devices 410, 420, 430, 440, 450 attached to various points on its external surfaces to allow for an omni-directional radio frequency (RF) coverage. In one or more embodiments, the wireless devices 410, 420, 430, 440, 450 transmit and receive wireless communications to at least one access point and at least one user.

For the system of the present disclosure, each outrigger payload is connected to at least one wireless device 410, 420, 430, 440, 450. In some embodiments, as depicted in FIG. 4, each outrigger payload is connected to a total of five wireless devices 410, 420, 430, 440, 450.

Figure 5:
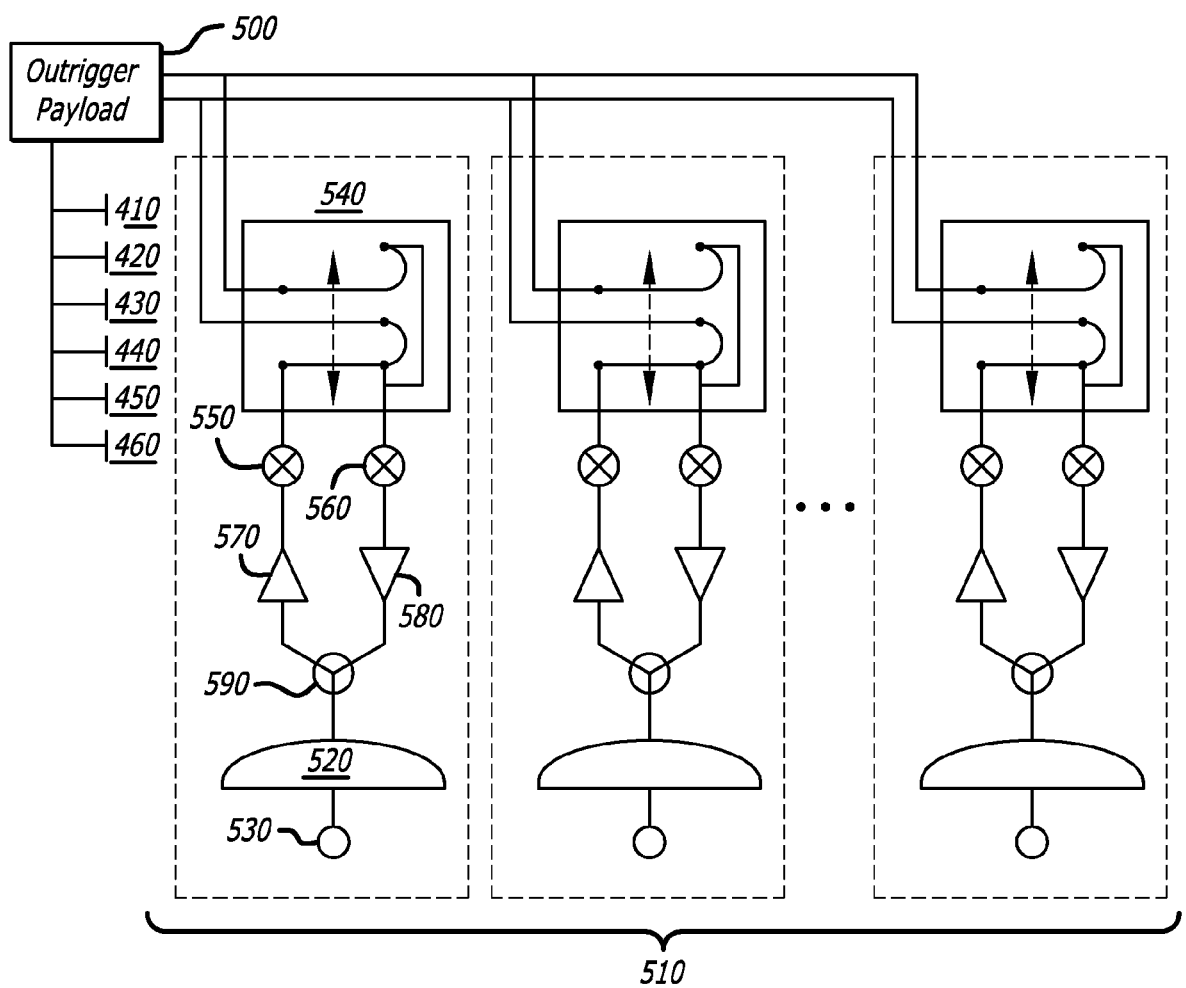
FIG. 5 is a schematic diagram of an outrigger integrated with a conventional radio frequency (RF) transponder system, in accordance with at least one embodiment of the present disclosure.

FIG. 5 shows a schematic diagram of an outrigger integrated with a conventional radio frequency (RF) transponder system, in accordance with at least one embodiment of the present disclosure. In this figure, an outrigger payload 500 is connected to six wireless devices 410, 420, 430, 440, 450, 460. Radio frequency (RF) antennas are employed for the wireless devices 410, 420, 430, 440, 450, 460. In one or more embodiments, the outrigger payload 500 comprises at least one transponder (not shown) and at least one processor (not shown). At least one transponder transmits and/or receives the wireless communications from at least one access point and at least one user. In some embodiments, at least one processor provides channelized communication and regenerative communication for at least one user. At least one processor also monitors the signal quality of the communications received from at least one user for any piggybacked waveforms from any unwanted signals and for any jammed signals.

The outrigger payload 500 is also connected to a conventional radio frequency (RF) transponder system 510. Conventional radio frequency (RF) transponder systems 510 generally include at least one uplink/downlink antenna 520 and at least one transponder 530. In this figure, the radio frequency (RF) transponder system 510 also includes a radio frequency (RF) switch matrix 540 for switching the outrigger to operating as an access point or to operating as a user. In addition, the radio frequency (RF) transponder system 510 includes mixers 550, 560; at least one receiver low noise amplifier (RX LNA) 570; at least one transmit power amplifier (TX PA); and at least one radio frequency (RF) isolator 590.

Figure 6:
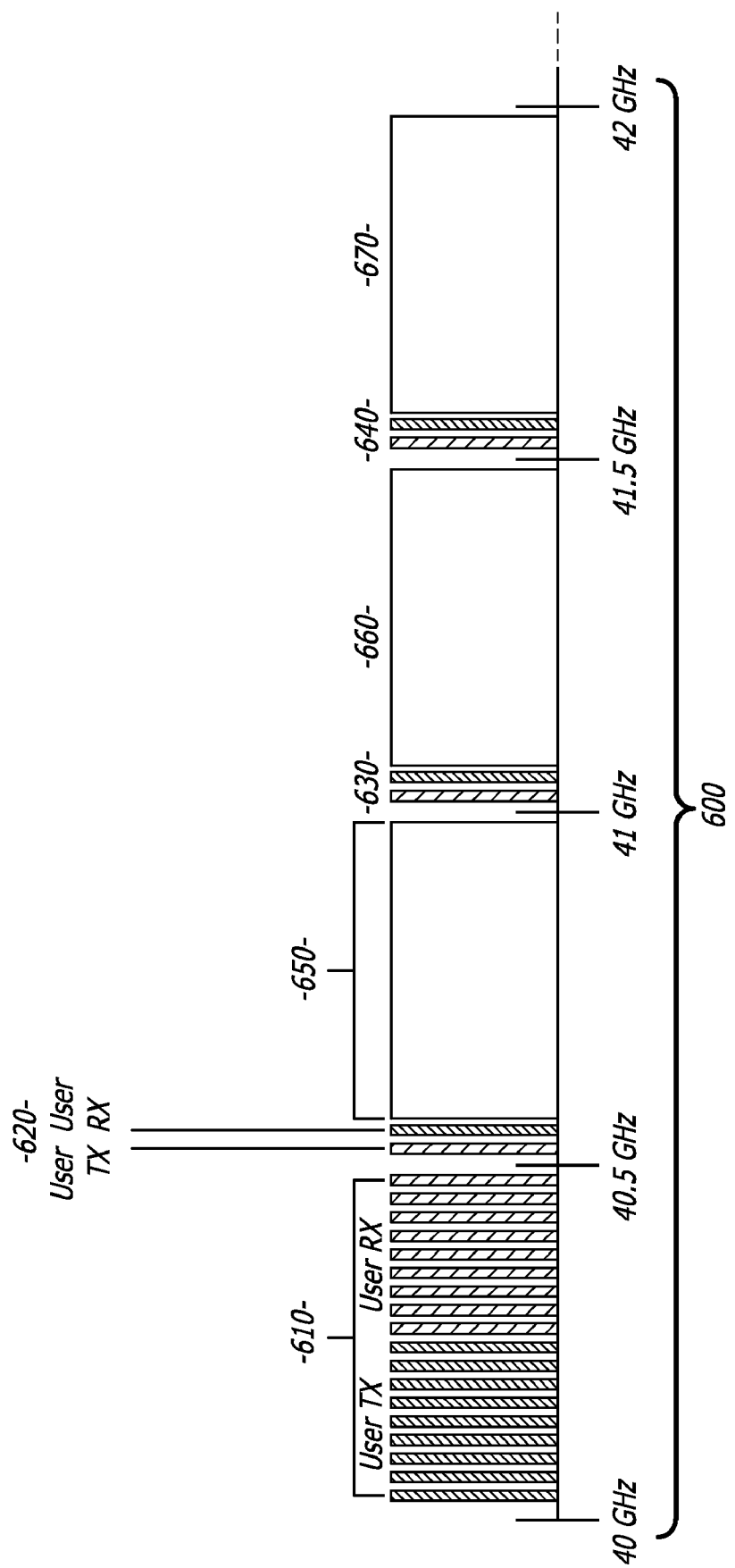
FIG. 6 is a graphical representation of an outrigger frequency plan, in accordance with at least one embodiment of the present disclosure.

FIG. 6 is a graphical representation of an outrigger frequency plan, in accordance with at least one embodiment of the present disclosure. As depicted in this figure, the outrigger frequency plan 600 includes an N number of narrowband collision-based packetized access request channels 610; at least one dedicated narrowband packetized access control channels 620, 630, 640; and at least one outrigger communication channels 650, 660, 670. The outrigger communication channels 650, 660, 670 carry channelized arbitrary user waveforms or demodulated/remodulated data. In one or more embodiments, the outrigger frequency plan 600 can be over a broad range of frequency bands including, but not limited to, a frequency band of 40 to 42 GHz, as is shown in the figure.

In order to explain how the outrigger frequency plan 600 of FIG. 6 is utilized for outrigger link communications, the following outrigger system use example is presented. In this example, a simplified government spacecraft, which happens to lack a large communications antenna and/or a high-power radio frequency (RF) communications amplifier, desires to "anonymously" downlink its data through a conventional commercial communications spacecraft.

For a better understanding of this example, it should be noted that conventional communications spacecraft are located in a geostationary orbit (GEO), which is 22,300 miles above the earth. Conventional communications spacecraft generally include 10 to 100 transponders that are linked to one or more satellite antennas, which have coverage areas of specific, fixed, regions of the earth's surface. During operation of a conventional communications spacecraft, each uplink receive (RX) transponder receives, via a specific satellite antenna, a specific bandwidth of signals of a specific frequency range. After receiving these signals, the uplink receive (RX) transponder inputs the signals into a downlink transmit (TX) transponder, which amplifies and retransmits the signals through either the same satellite antenna or a different satellite antenna. Since a typical geostationary (GEO) spacecraft can view about one-third of the earth's surface, it is possible for a user that is located anywhere within this vast coverage area to use a RX/TX transponder to communicate with any other user that also located within the coverage area.

In this example, the government spacecraft maneuvers within range of a commercial communications spacecraft. For this example, the government spacecraft is a user, and the commercial communications spacecraft operates as an access point. When the government spacecraft (user) is in proximity of the commercial communications spacecraft (access point), the government spacecraft (user) outrigger payload gains the attention of the commercial communications spacecraft (access point) outrigger payload by operating in a broadcast mode during its initial communication with the commercial communications satellite (access point) outrigger payload. When operating in a broadcast mode, the government spacecraft (user) outrigger payload transmits an access request (AR) packet on one of several collision-based packetized access request (AR) frequencies 610 of a specific frequency band, or on one or more of the dedicated narrowband packetized access control (AC) channels 620. In one or more embodiments, the specific frequency band is V-band and/or W-band.

In one or more embodiments, the access request (AR) packet contains an encrypted "access permission ticket", which contains data regarding the scope of the resources that the user desires to use. In some embodiments, the scope of the resources includes, but is not limited to, length of time of access, frequency bandwidth, and types of resources. Once the commercial communications spacecraft (access point) outrigger payload receives the access request (AR) packet, the commercial communications spacecraft (access point) outrigger payload checks the access request (AR) packet data for corruption and decrypts the data. In one or more embodiments, government approved civilian cryptographic methods, such as data encryption standard (DES), are used by the outrigger payload for the decryption of the data.

After the commercial communications spacecraft (access point) outrigger payload decrypts the data, the commercial communications spacecraft (access point) outrigger payload verifies if it has the requested resources available for the user to access. If the commercial communications spacecraft (access point) outrigger payload determines that the requested resources are available, the commercial communications spacecraft (access point) outrigger payload assigns a dedicated, encrypted, packetized access control (AC) channel 620, 630, 640 to the government spacecraft (user) outrigger payload. This bidirectional channel 620, 630, 640 is used by the commercial communications spacecraft (access point) outrigger payload to acknowledge the channelized bandwidth and downlink wireless device resources that have been assigned; to negotiate the outrigger link center frequency; and to monitor the link characteristics.

The government spacecraft (user) outrigger then acknowledges the assignments and begins low-power signal transmission over the assigned outrigger communication channel 650, 660, 670 to the commercial communications spacecraft (access point) outrigger. Once the commercial communications spacecraft (access point) outrigger receives the signal, the commercial communications spacecraft (access point) payload converts the signal to the selected transponder frequency. The commercial communications spacecraft (access point) outrigger payload then switches the signal with a switch matrix to the selected downlink transmit power amplifier (PA) and wireless device.

In one or more embodiments, data embedded in the outrigger and downlink channels is never demodulated or decrypted by the access point outrigger payload and, therefore, the data is secure. In addition, the user waveform is never demodulated and remodulated. Since the user waveform is never demodulated or remodulated, the user waveform also remains anonymous to the access point spacecraft and, therefore, the security of the user waveform is preserved.

Figure 7:
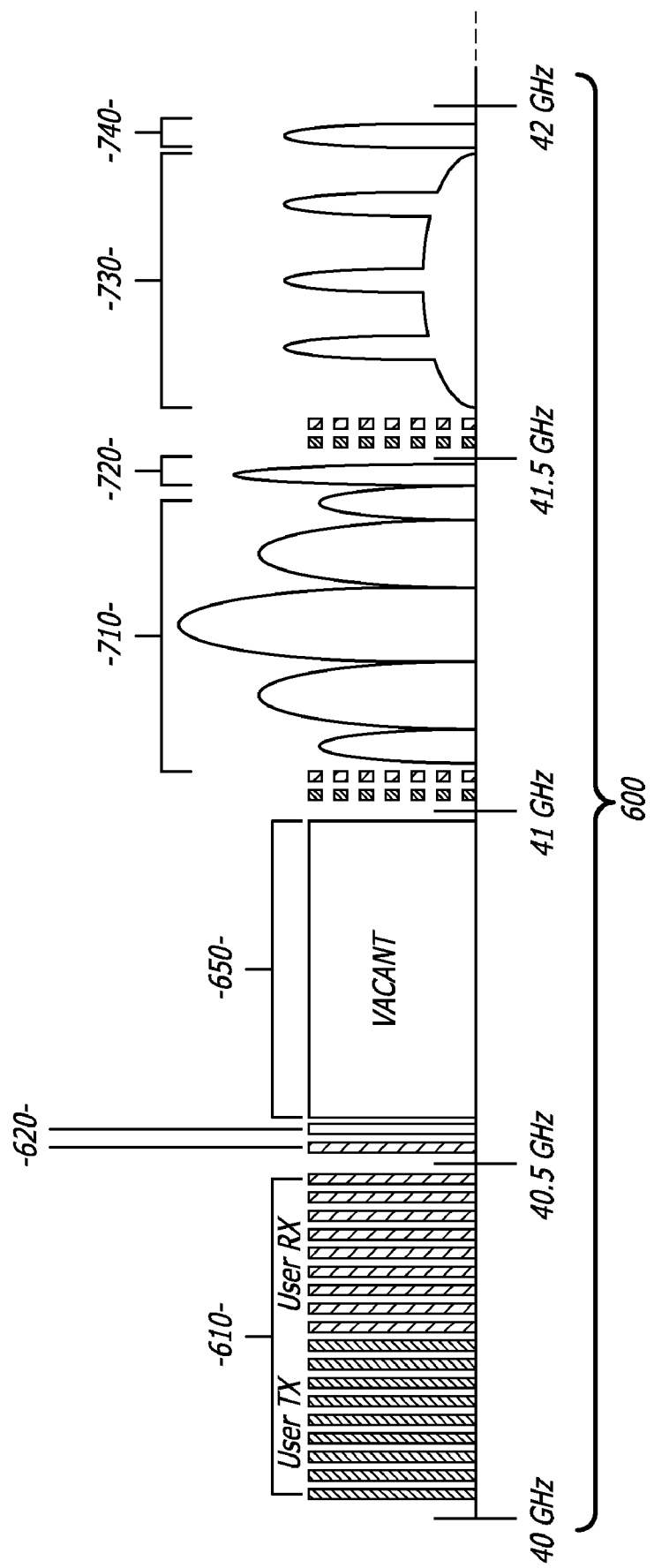
FIG. 7 is a graphical representation of an outrigger power spectral density monitoring of channelized links, in accordance with at least one embodiment of the present disclosure.

FIG. 7 illustrates a graphical representation of an outrigger power spectral density monitoring of channelized links, in accordance with at least one embodiment of the present disclosure. For the outrigger system, both user outrigger payloads and access point outrigger payloads monitor the outrigger communications link for interference and "piggybacking" of unwanted signals. In FIG. 7, a piggyback waveform 720 is detected in the power spectral density (PSD) of the outrigger channel for user A 710. Also in this figure, the power spectral density (PSD) of the outrigger channel for user B 730 is shown to be comingled with a detected jammer power spectral density (PSD). Additionally, a piggyback waveform 740 is detected in the power spectral density (PSD) of the outrigger channel for user B 730.

In one or more embodiments, the outrigger payload performs power-spectral density (PSD) measurements over time. The outrigger payload then compares the power spectral density (PSD) of the outrigger channel 710, 730, based on knowledge of the transmitted waveform, with the waveform that is actually received. Since the user outrigger payload has an in-depth knowledge of the waveforms for both the transmitted and received signals, the user outrigger payload has knowledge of the expected power spectral density (PSD). The access point outrigger payload, which does not necessarily have knowledge of the carried transmit (TX) and receive (RX) signals, measures the power spectral density (PSD) frequently, and sends the power spectral density (PSD) descriptor word to the user outrigger payload via the encrypted, bidirectional access control (AC) channel 620.

If at any time the bidirectional flow of the uncorrupted access control (AC) packets is interrupted, or if the power spectral density (PSD) descriptor word does not sufficiently match the expected power spectral density (PSD), the communications link between the user outrigger and the access point outrigger is mutually terminated. During this mutual termination, the user outrigger payload simply stops transmitting encrypted access control (AC) packets to close the outrigger communication channel 650, 710, 730 provided by the access point outrigger payload. Upon cessation of receiving encrypted access control (AC) packets, the access point outrigger payload closes the outrigger communication channel 650, 710, 730, and restores its internal switching to its default state. These mutual termination procedures enable the user outrigger payload and the access point outrigger payload to mutually close an outrigger communication channel 650, 710, 730 that has been corrupted by interference or by piggybacking of unwanted signals. After an outrigger communication channel 650, 710, 730 has been closed, a user outrigger payload may request the access point outrigger payload to provide the user outrigger payload with a new outrigger communication channel 650, 710, 730 on a different frequency.

Figure 8:
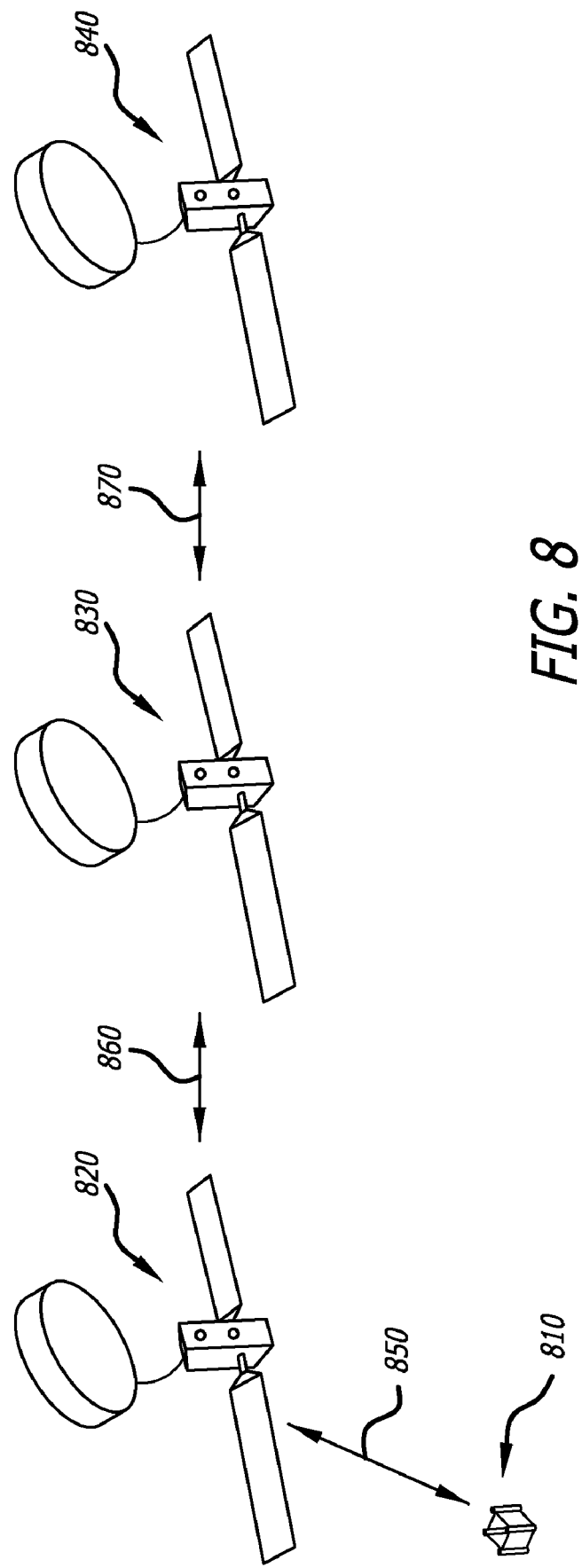
FIG. 8 is an illustration of outriggers enabling access points and users to share and coordinate their resources on-demand in a daisy-chain configuration, in accordance with at least one embodiment of the present disclosure.

FIG. 8 shows an illustration of outriggers enabling access points and users to share and coordinate their resources on-demand in a daisy-chain configuration, in accordance with at least one embodiment of the present disclosure. In this figure, outriggers, which are integrated into orbital monitoring spacecraft 810 and geostationary earth orbit (GEO) satellites 820, 830, 840 are routing wireless communications and are enabling inter-spacecraft resource sharing in a daisy-chain configuration. As is shown in this figure, the outrigger that is integrated into orbital monitoring spacecraft 810 has a wireless link 850 with geostationary earth orbit (GEO) satellite 820; the outrigger that is integrated into geostationary earth orbit (GEO) satellite 820 has a wireless link 860 with geostationary earth orbit (GEO) satellite 830; and the outrigger that is integrated into geostationary earth orbit (GEO) satellite 830 has a wireless link 870 with geostationary earth orbit (GEO) satellite 840.

In one or more embodiments of the present disclosure, outriggers may be employed in geostationary earth orbit (GEO) observation spacecraft and/or medium earth orbit (MEO) observation spacecraft that are simplified by removal of their own large earth communication antennas and amplifiers. The simplification of these spacecraft enables these spacecraft to be smaller in size, lighter in mass, less expensive, and less observable.

In some embodiments, outriggers of the present disclosure may be incorporated in small geostationary earth orbit (GEO) inspection spacecraft and/or small medium earth orbit (MEO) inspection spacecraft that monitor the status and actions of other nearby spacecraft, as well as serve to remove debris. Inspection spacecraft are required to be low in mass and small in size in order to conserve their mobility resources and minimize their chances of accidental collisions with other spacecraft. With the use of outriggers for these types of spacecrafts, large solar arrays and/or antennas can be reduced or eliminated.

In at least one embodiment of the present system, outriggers may be incorporated into low earth orbit (LEO) observation spacecraft that are simplified by removal of their directional communications antennas and amplifiers. This simplification of these spacecraft allows for these spacecraft to be much smaller in size, lighter in mass, less expensive, and much less observable. The communications for these spacecraft, through the use of outriggers, are integrated into the downlink of other innocuous spacecraft located in nearby orbits.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A system for enabling on-demand inter-spacecraft resource sharing and coordination, the system comprising:
    at least one wireless device for transmitting and receiving communications to at least one access point and at least one user to enable the on-demand inter-spacecraft resource sharing and coordination, wherein the at least one access point is a spacecraft and the at least one user is a spacecraft; and
    a payload, wherein the payload comprises:
        at least one transponder for transmitting and receiving the communications to the at least one access point and the at least one user; and
        at least one processor for providing channelized communication and regenerative communication for the at least one user,
        wherein the at least one processor monitors signal quality of the communications received from the at least one user.

2. The system of claim 1, wherein the at least one wireless device is a radio frequency (RF) antenna.

3. The system of claim 2, wherein the radio frequency (RF) antenna is a short, fixed omni-directional stub antenna.

4. The system of claim 2, wherein the radio frequency (RF) antenna transmits and receives V-band.

5. The system of claim 2, wherein the radio frequency (RF) antenna transmits and receives W-band.

6. The system of claim 1, wherein the at least one wireless device is a diffuse optical emitter and receiver that transmits and receives optical communications.

7. The system of claim 1, wherein the at least one processor operates in a broadcast mode during initial transmission communication with the at least one user.

8. The system of claim 1, wherein the at least one processor monitors the signal quality of the communications for any piggybacked waveforms from any unwanted signals.

9. The system of claim 1, wherein the at least one processor monitors the signal quality of the communications for any jammed signals.

10. A method for enabling on-demand inter-spacecraft resource sharing and coordination, the method comprising:
    transmitting and receiving, with at least one wireless device, communications to at least one access point and at least one user to enable the on-demand inter-spacecraft resource sharing and coordination, wherein the at least one access point is a spacecraft and the at least one user is a spacecraft;
    transmitting and receiving, with at least one transponder, the communications to the at least one access point and the at least one user; and
    providing, with at least one processor, channelized communication and regenerative communication for the at least one user,
    wherein the at least one processor monitors signal quality of the communications received from the at least one user.

11. The method of claim 10, wherein the at least one wireless device is a radio frequency (RF) antenna.

12. The method of claim 11, wherein the radio frequency (RF) antenna is a short, fixed omni-directional stub antenna.

13. The method of claim 11, wherein the radio frequency (RF) antenna transmits and receives V-band.

14. The method of claim 11, wherein the radio frequency (RF) antenna transmits and receives W-band.

15. The method of claim 11, wherein the at least one wireless device is a diffuse optical emitter and receiver that transmits and receives optical communications.

16. A system for enabling on-demand inter-spacecraft resource sharing and coordination, the system comprising:
    at least one wireless device means for transmitting and receiving communications to at least one access point and at least one user to enable the on-demand inter-spacecraft resource sharing and coordination, wherein the at least one access point is a spacecraft and the at least one user is a spacecraft; and
    a payload, wherein the payload comprises:
        at least one transponder means for transmitting and receiving the communications to the at least one access point and the at least one user; and
        at least one processor means for providing channelized communication and regenerative communication for the at least one user,
        wherein the at least one processor means monitors signal quality of the communications received from the at least one user.

\* \* \* \* \*